US008898076B2

(12) United States Patent  (10) Patent No.: US 8,898,076 B2
Vasquez et al.  (45) Date of Patent: Nov. 25, 2014

(54) SYSTEMS AND METHODS FOR INTEGRATED, SECURE POINT-OF-SALE TRANSACTIONS HAVING AN ADJUSTABLE BASE STATION

(71) Applicants: William P. Vasquez, Yuba City, CA (US); Cheng-Ai Huang, Hsinchu (TW); Gary Li, Hsinchu (TW)

(72) Inventors: William P. Vasquez, Yuba City, CA (US); Cheng-Ai Huang, Hsinchu (TW); Gary Li, Hsinchu (TW)

(73) Assignee: Simply Charged, Inc., Yuba City, CA (US)

( * ) Notice: Subject to any disclaimer, the term of this patent is extended or adjusted under 35 U.S.C. 154(b) by 0 days.

(21) Appl. No.: 13/827,131

(22) Filed: Mar. 14, 2013

(65) Prior Publication Data

US 2014/0279110 A1  Sep. 18, 2014

(51) Int. Cl.
*G06Q 20/00* (2012.01)
*G06Q 20/20* (2012.01)
*G06Q 20/32* (2012.01)

(52) U.S. Cl.
CPC ............ *G06Q 20/202* (2013.01); *G06Q 20/325* (2013.01); *G06Q 20/3227* (2013.01)
USPC .......................................................... 705/16

(58) Field of Classification Search
CPC .................................................. G06Q 20/3227
USPC .......................................................... 705/16
See application file for complete search history.

(56) References Cited

U.S. PATENT DOCUMENTS

| | | | |
|---|---|---|---|
| 7,350,230 | B2* | 3/2008 | Forrest ............................. 726/9 |
| 2010/0002371 | A1* | 1/2010 | Lee ........................... 361/679.44 |
| 2010/0161403 | A1 | 6/2010 | Fisher et al. |
| 2012/0011007 | A1 | 1/2012 | Blewett et al. |
| 2012/0215648 | A1 | 8/2012 | Rose et al. |
| 2012/0278188 | A1 | 11/2012 | Attar et al. |
| 2013/0041831 | A1 | 2/2013 | Das |
| 2013/0080276 | A1 | 3/2013 | Granbery |
| 2013/0144731 | A1 | 6/2013 | Baldwin et al. |
| 2014/0059263 | A1* | 2/2014 | Rosenberg et al. ........... 710/303 |
| 2014/0229326 | A1* | 8/2014 | Carpenter et al. ........... 705/26.7 |

OTHER PUBLICATIONS

Mutual mobile introduces mobile sales enablement solution. (2012). Wireless News, NA. Retrieved from http://search.proquest.com/professional/docview/1096396201?accountid=161862.*

* cited by examiner

*Primary Examiner* — Scott Zare
(74) *Attorney, Agent, or Firm* — Procopio Cory Hargreaves & Savitch LLP; Noel C. Gillespie

(57) ABSTRACT

A system for processing transactions, having at least one mobile device having a housing having a processor, and a Wi-Fi Communication module disposed therein; a base station having a base station housing, wherein the base station housing houses an embedded system including a processor; and a Wi-Fi communication module configured to communicate with the Wi-Fi communication module of the at least one mobile device; a support stand configured to support the at least one mobile device, wherein the support stand comprises at least one arm having an adjustable position and configured to move to adjust the size of the support stand based on a size of the at least one mobile device; and at least one peripheral device connected to the base station.

7 Claims, 17 Drawing Sheets

SW Block Diagram of iPAD Base Station

SW Block Diagram of iPAD Base Station

SW Block Diagram of iPAD Base Station

SW Block Diagram of iPAD Base Station

SYSTEMS AND METHODS FOR INTEGRATED, SECURE POINT-OF-SALE TRANSACTIONS HAVING AN ADJUSTABLE BASE STATION

BACKGROUND

1. Field

The embodiments described herein relate to point-of-sale (POS) transactions and more specifically to systems and methods that enable integrated and secure POS transactions using low cost tablet devices.

2. Description of the Related Art

A conventional POS system comprises a large cash register. Early Electronic Cash Registers (ECRs) were controlled by proprietary software and had limited functionality. Eventually these ECR's were able to interface with a backend system that provided accounting, reporting and other functionality. But these earlier systems in addition to being physically bulky were also typically proprietary systems in that there were no uniform standards across the industry. Often, these systems were server-client systems that were costly to own and operate.

More recently, the availability of local processing power, local data storage, networking, and graphical user interface made it possible to develop flexible and highly functional POS systems. Cost of such systems has also declined, as all the components can now be purchased off-the-shelf. A conventional retail POS system now typically includes a computer, monitor, cash drawer, receipt printer, customer display and a barcode scanner, and the majority of retail POS systems also include a debit/credit card reader. It can also include a weight scale, integrated credit card processing system, a signature capture device and a customer pin pad device. At the core of the modern POS system is some type of CPU that runs the POS system. The other components are then peripherals that can be interfaced with the CPU as needed.

More and more POS monitors use touch-screen technology for ease of use and a computer is built in to the monitor chassis for what is referred to as an all-in-one unit. All-in-one POS units liberate counter space for the retailer. The POS system software can typically handle myriad customer based functions such as sales, returns, exchanges, layaways, gift cards, gift registries, customer loyalty programs, BOGOF (buy one get one free), quantity discounts and much more. POS software can also allow for functions such as pre-planned promotional sales, manufacturer coupon validation, foreign currency handling and multiple payment types.

In the retail environment, the POS unit handles the sales to the consumer but it is only one part of the entire POS system used in a retail business. "Back-office" computers typically handle other functions of the POS system such as inventory control, purchasing, receiving and transferring of products to and from other locations. Other typical functions of a POS system are to store sales information for reporting purposes, sales trends and cost/price/profit analysis. Customer information may be stored for receivables management, marketing purposes and specific buying analysis. Many retail POS systems include an accounting interface that "feeds" sales and cost of goods information to independent accounting applications.

Moreover, recently new applications have been introduced that enable POS transactions to be conducted using mobile phones and tablets. New entrants include Square, Intuit's GoPayments, and NCR Inc.'s Silver platform, ezyMART POS, ShopKeep POS, and GoPago. This is an important development, because in the United States alone, there are over 5 million small merchants who do not handle a large amount of transaction. As a result, they are very price sensitive toward the POS system and the payment system.

A major problem with these newer, mobile device centric systems is that they lack the necessary security. The more conventional systems described above suffer from higher cost, and limited flexibility. Another issue with these conventional systems the material flow, e.g., the process around reading the bar code on an item, and the payment process are two separate processes run by different applications.

SUMMARY

The embodiments described herein are related to system and methods for a tablet or mobile based POS system that provides the necessary security and integrated material and payment processing.

One aspect provides a system for processing transactions, comprising: at least one mobile device comprising a housing having a processor, and a Wi-Fi Communication module disposed therein; and a base station comprising a base station housing, wherein the base station housing houses an embedded system comprising: a processor, and a Wi-Fi communication module configured to communicate with the Wi-Fi communication module of the at least one mobile device, a support stand configured to support the at least one mobile device, wherein the support stand comprises at least one arm having an adjustable position and configured to move to adjust the size of the support stand based on a size of the at least one mobile device; and at least one peripheral device connected to the base station.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The embodiments described herein have several aspects that will be described. These aspects include the hardware designs, e.g., the physical stand, base, interconnections, etc.; the electronic hardware design; the software design; and the communication processes. Each of these aspects is described in detail below.

Hardware

Figure 1:
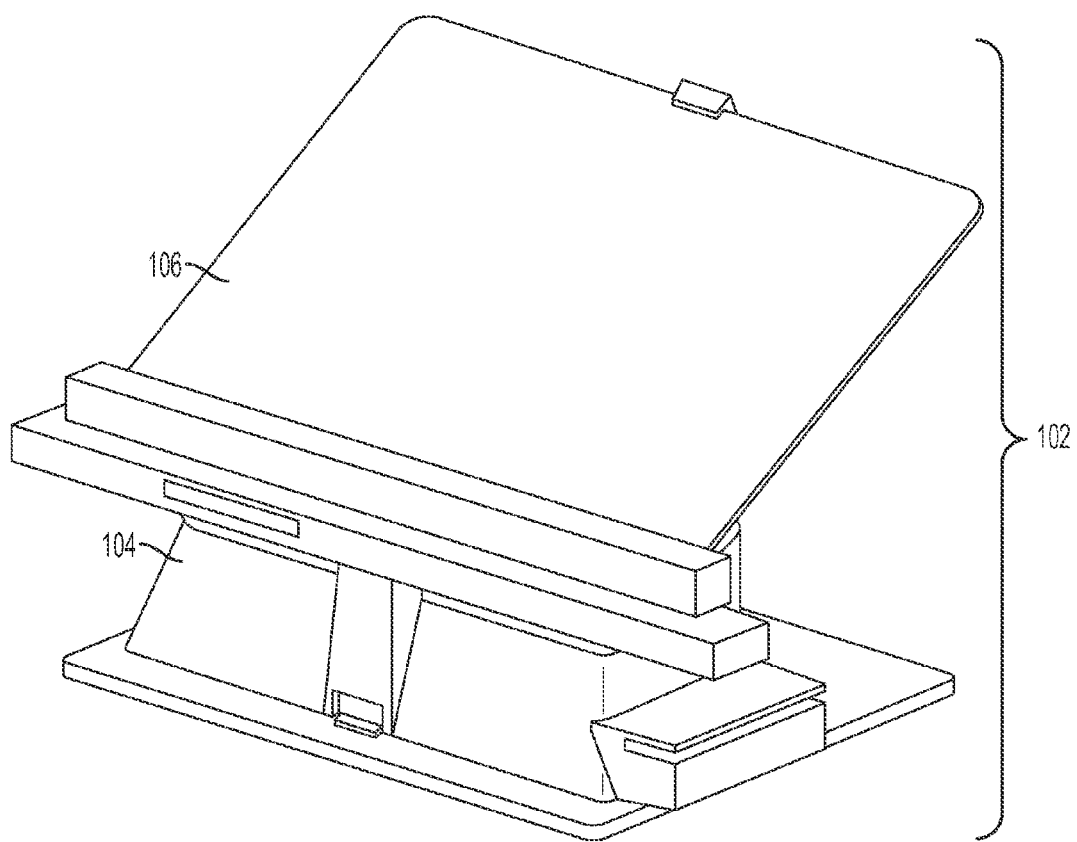
FIG. 1 illustrates a first perspective view of base station according to a first embodiment of the present application.
Figure 2:
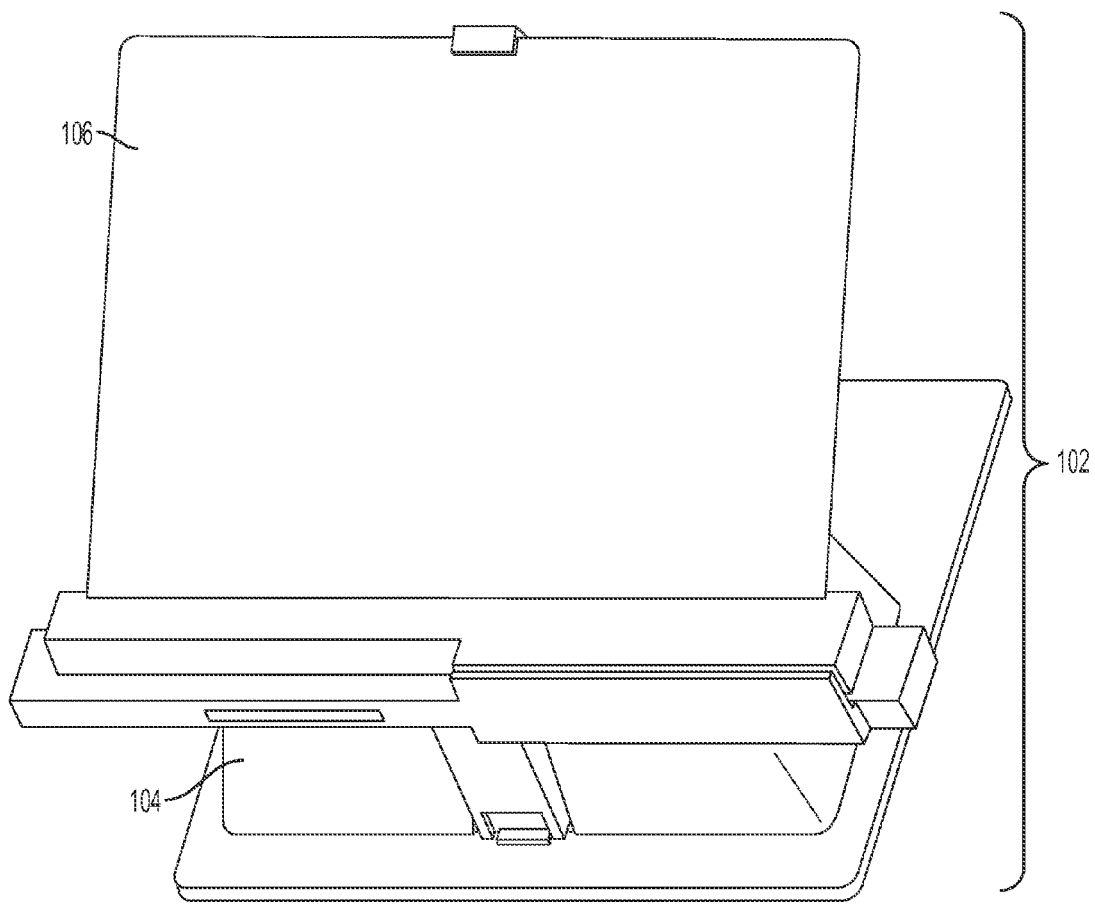
FIG. 2 illustrates a second perspective view of the base station.

The embodiments described herein include a base stations and a mobile device such as a tablet device. FIGS. 1 and 2 illustrate an example base station 102 configured in accordance with on example embodiment. As can be seen, base station 102 can comprise or act as a base to hold the mobile device or tablet. Thus, base station 102 can include a base portion 104 and a support portion 106 for holding the mobile or tablet device. The base station 102 can also provide charging function for the mobile or tablet device, as well as connection to an external wireless router. In certain embodiments, the base station can include a router. The base station 102 can also include a processor and memory as described in more detail below.

Using a mobile device or tablet allows the device to be removed from support portion 106 so that it can be moved throughout a store or retail location. The tablet can provide the user interface needed to process transactions, the base station's processor can be configured to then process the transaction. Other peripherals can then be added in a modular fashion to base station 102. For example, a scanner(s), printer, register, card reader, etc., can be added to or interfaced with base station 102. Thus, base station 102 can include various Input-Output (I/O) ports, such as a RJ12 24V cash register port, RS232 ports with 5V/12V support for printer and VFD display, one USB port for a bar code scanner and three other USB expansion ports, e.g., one on the front and the other in the rear, a 10/100M Ethernet interface, a stereo audio port, or some combination thereof. It will be understood that these are just examples.

Figure 3:
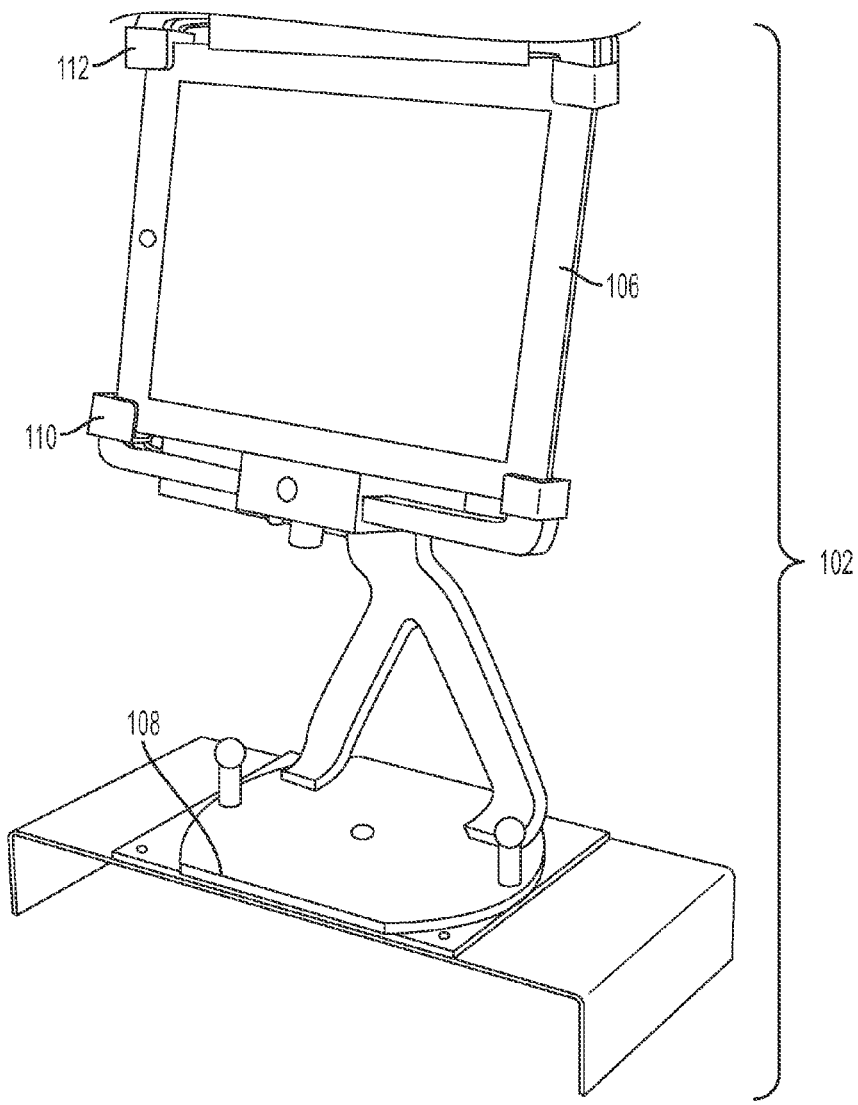
FIG. 3 illustrates a front view of the base station with a mobile device.
Figure 4:
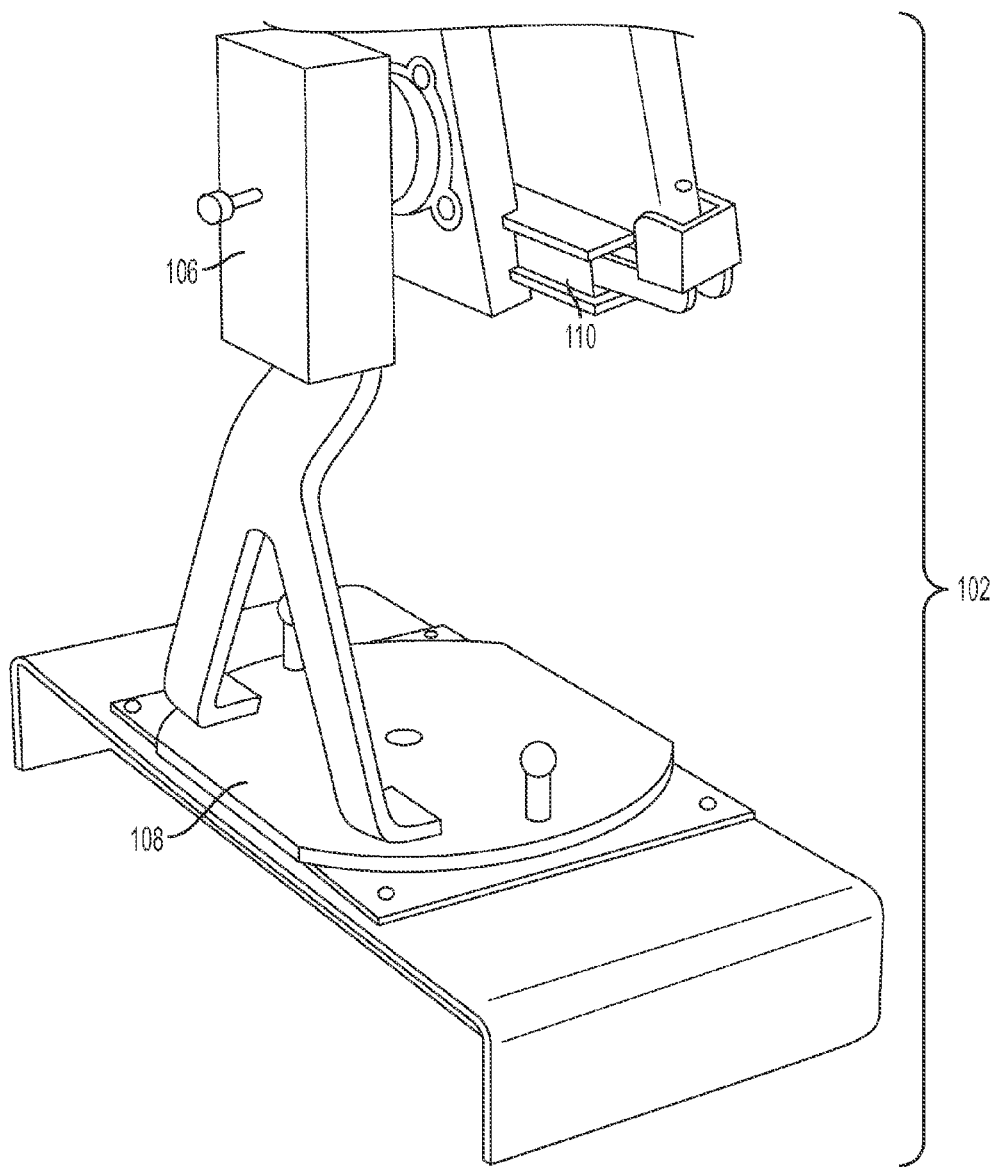
FIG. 4 illustrates a back view of the base station and mobile device.

In certain embodiments, the support portion 106 can swivel as illustrated in FIGS. 3 and 4. As can be seen in FIGS. 3 and 4, which provide front and back views, the base 108 of support 106 can swivel in these implementations.

Figure 5A:
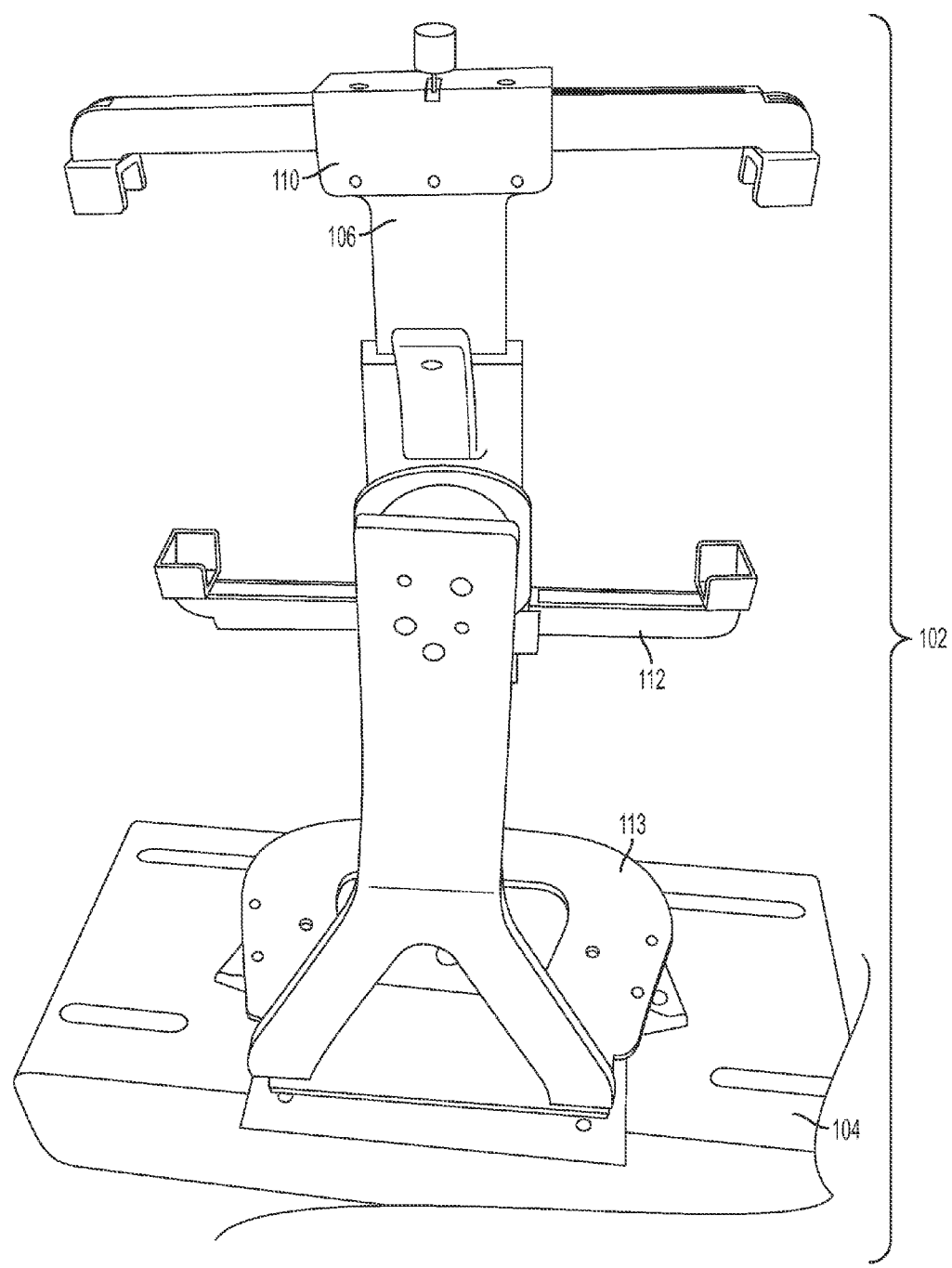
FIG. 5A-5E illustrates several enlarged views of various portions of the base station.
Figure 5B:
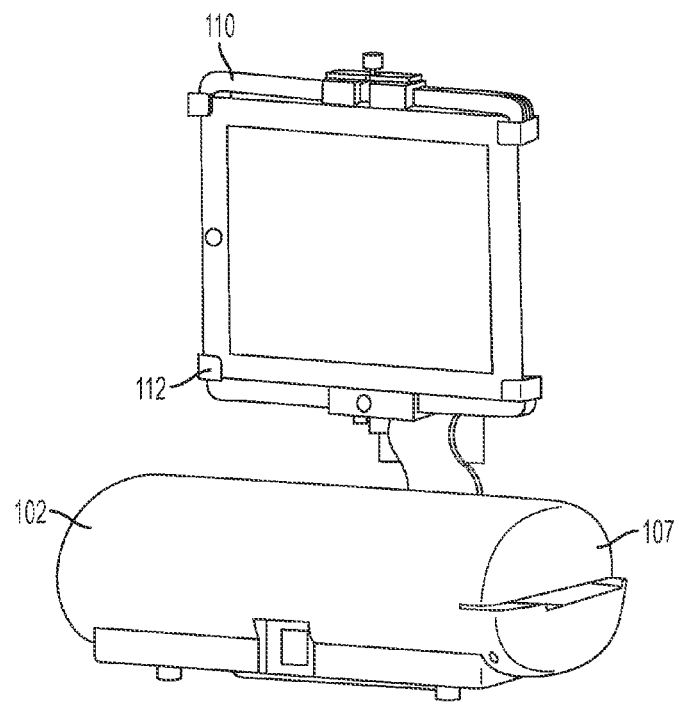
Figure 5C:
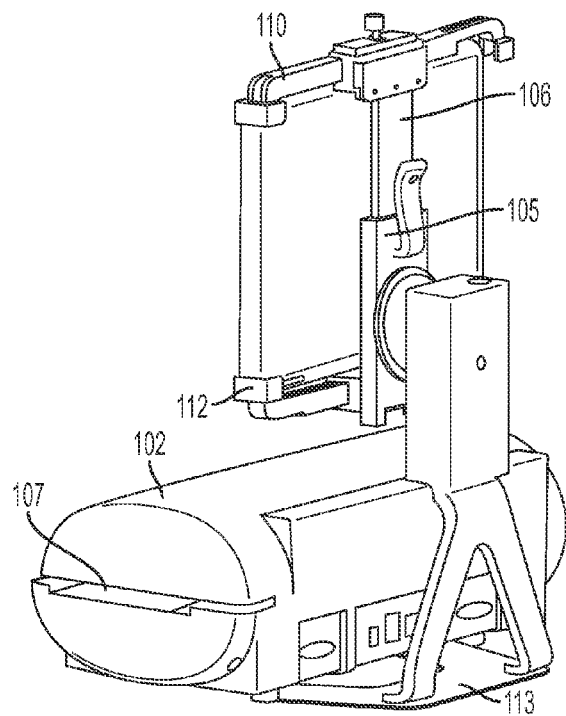

FIG. 5A is a diagram with another support portion 106 that can adjust to fit different sized tablets or mobile devices via adjustable arms 110 and 112, which can slide in and out. Also, support portion 106 can be configured such that it can be elongated or collapsed in order to move top arms 110 up and down. FIGS. 5B and 5C illustrate an alternative embodiment of base station 102 that use the support portion 106 of FIG. 5A. As can be seen, base station 102 sits on base portion 113. The I/O ports can be seen on the back of base station 102 in FIG. 5C. Also, a scanner or card reader 107 can be built into base station 102 as illustrated in both FIGS. 5B and 5C. The adjustable portion 105 of support portion 106 can be seen in FIG. 5C.

Figure 5D:
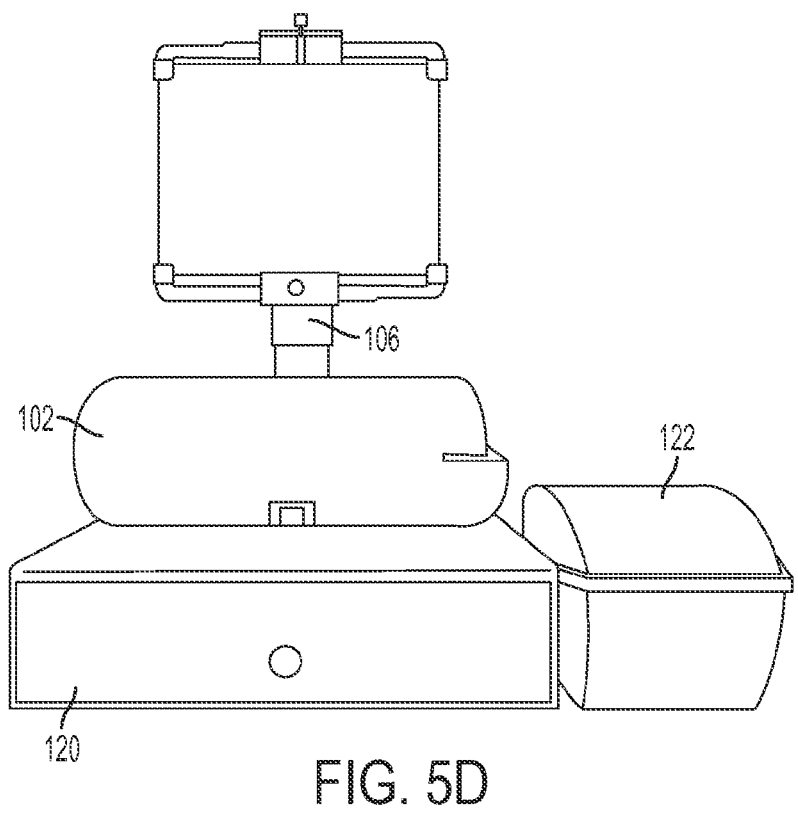

FIG. 5D illustrates the base station 102 and adjustable support portion 106 of FIGS. 5A-C integrated with a cash register 120 and a printer 122.

Figure 5E:
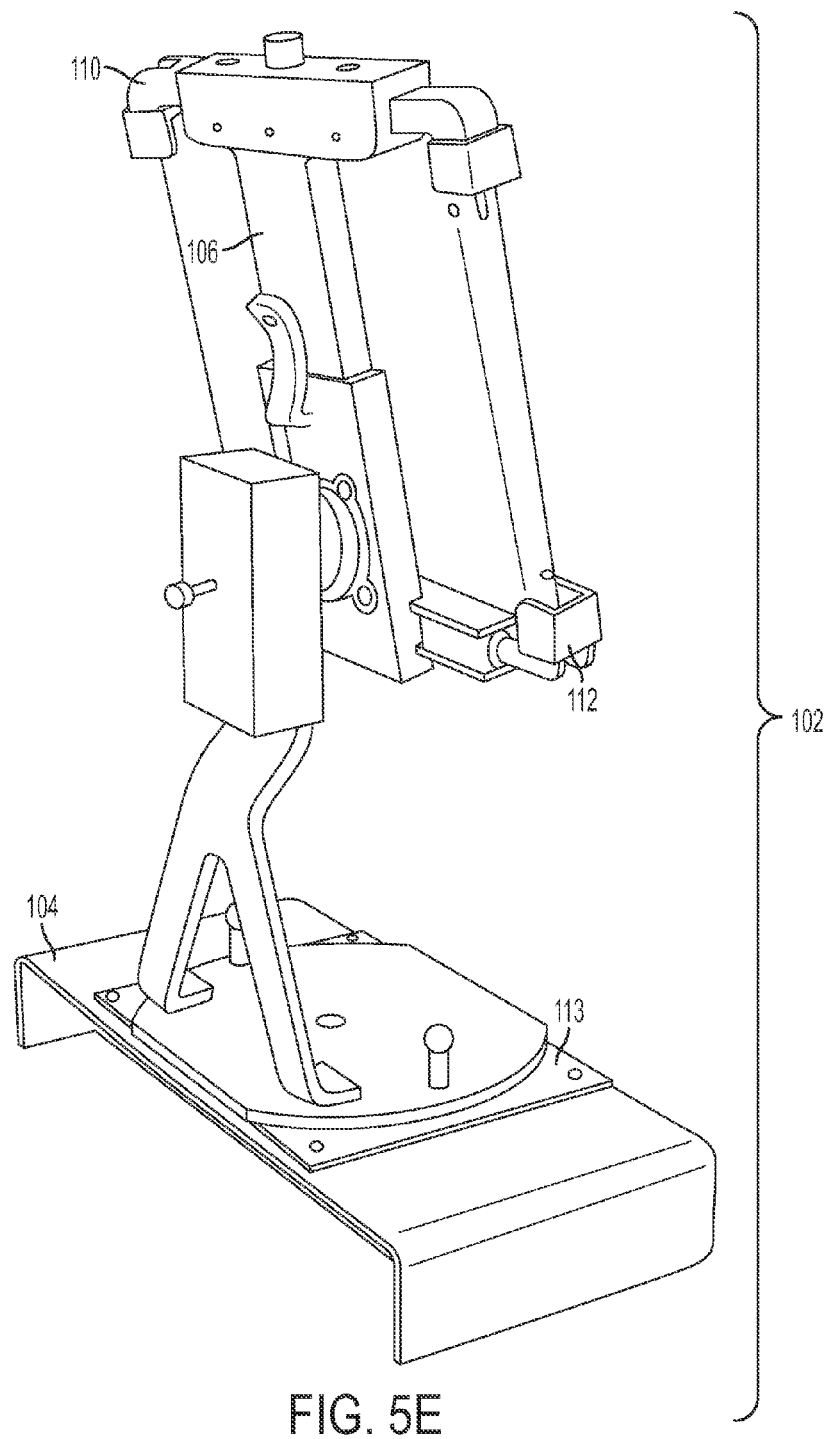

In the embodiment of FIG. 5E, support portion 106 includes arms 112 that can slide outward or inward as needed.

While not illustrated, certain embodiments can include a casing for the tablet through which the tablet can interface with base station 102. The case can either be a water resistant design or a basic version. The casing can allow for charging through a standard port on the base station allowing the same base station to support multiple tablet models despite the various connector designs and locations. The charging port will also allow for the base station 102 to sense that the tablet is physically present for cash transactions preventing the cash drawer from inadvertently deploying when the sales associate is not present. Further, a cash drawer may be opened accidentally where the cashier may complete the transaction on the floor but he or she is not present at the cash drawer. Therefore, by adding a physical detection of the tablet being on the stand by adding the contact pin or RFID reader, this error can be prevented. The cashier has to physically go back to the cash drawer and install the stand before he or she can open the cash drawer. In some embodiments, the application can support multiple tablets on one station by assigning each tablet a unique identification number through the use of an RFID tag adhered to the back of each tablet. A reader installed on the stand connected to the base station will allow the base station to authenticate that the tablet performing the transaction is physically located at the base station.

FIGS. 12A-12D provide perspective views of a case 1400 for a tablet 1404 having a card reader 1410 incorporated directly into the case 1400. The case 1400 includes a front frame 1402, a rear inner case 1406, and a rear outer case 1414. The front frame 1402 and the rear inner case 1406 surround the tablet 1404 from the front and back sides respectively. The front frame 1402 and the rear inner case 1406 are configured to engage each other and create a seal around the tablet 1404 within the case 1400. The rear inner case 1406 may also include a hinged stand 1412 that can be opened to support tablet in an upright orientation. The rear inner case 1406 also may have a card reader receiving portion 1416 to hold the card reader 1410. In the embodiment shown in FIG. 12A, the card reader receiving portion 1416 may include a slot or groove configured to receive the card reader 1410. Further, a locking member 1408 may be provided to hold the card reader 1410 in the card reader receiving portion 1416. The rear outer case 1414 is configured to attach to the rear of the rear inner case 1406 after the card reader 1410 has been inserted in to the card reader receiving portion 1416.

Electronic Hardware

Figure 6:
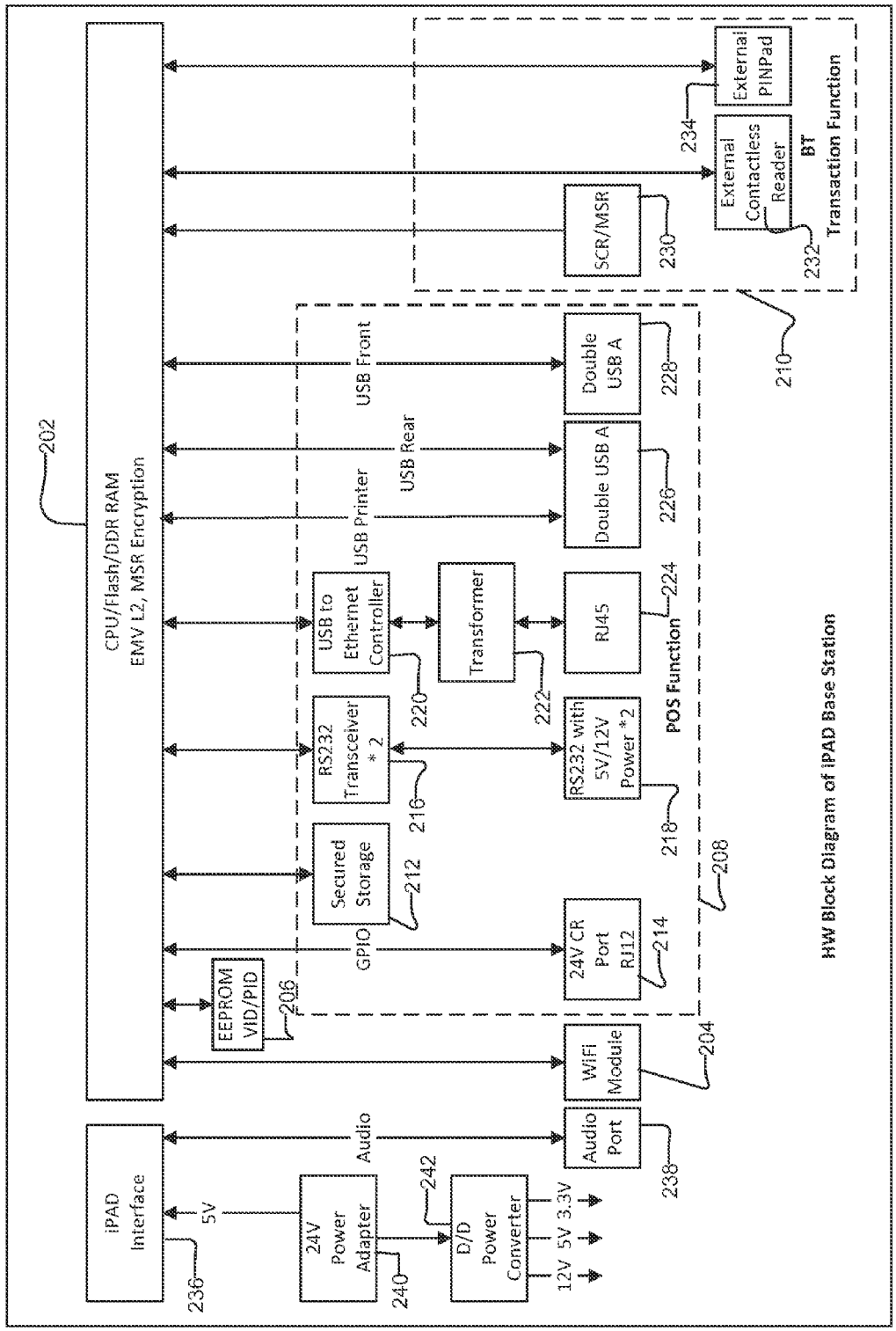
FIG. 6 illustrates a block diagram of the electronic hardware of the base station.

FIG. 6 is a diagram illustrating the electronic hardware components of a base station 102 configured in accordance with one embodiment. As can be seen, from an electronic hardware perspective, base station 102 can include a processor or CPU as well as main program memory, DDR RAM, FLASH, etc., in hardware block 202. This block 202 can also include an EMV processing and encryption capability as described in more detail below.

Block 202 can be interfaced with a Wi-Fi module 204, a non-volatile memory such as an Electrically Erasable Programmable Memory (EEPROM) 206, a POS function block 208, and a transaction function block 210. A unique identifier (VID/PID) and other information can be stored in the non-volatile memory 206 inside base station. The tablet can use this data for authentication between the tablet and the base station 102.

POS block 208 can include a secured storage 212. All confidential customer data, business data and transaction data can be password-protected and DES/AES encrypted and stored in this drive. Only with the correct password and matched base station can the stored data be accessed. POS block 208 can also include various interface modules including a RJ12 port 214, a RS232 transceiver 216 can port 218, a USB to Ethernet controller 220, transformer 222, and RJ45 port 224, and a plurality of USB ports such as ports 226 and 228.

Transaction function block 210 can comprise magnetic stripe card reader, a secured magnetic strip card reader and a smartcard reader module 230 as well as interfaces for a contactless reader 232 and PINpad (Personal Identification Number Pad) 234. The architecture of a secured magnetic stripe reader includes a magnetic stripe reader head, a flexible PCB and a 8-bit Micro CPU. The magnetic stripe reader head has three tracks and has six pins out from the reader head. A three layer flexible PCB is soldered to the six pins on the reader head. An epoxy is used to pot the connection between the reader head and the flexible PCB to provide it with security. The flexible PCB has three layers and the top and the bottom layers are designed with electronic fence to prevent any thief from tapping the magnetic stripe traces. The micro CPU is soldered on a small PCB and is potted with epoxy and protected with a PCB based electronic fence to prevent anyone from probing the CPU. This gives the base station a physical security protection for the magnetic stripe reader. The CPU will encrypt the magnetic stripe data in the potted area and will send the encrypted data to the base station to complete the transaction.

Base station 102 can also include a tablet interface block 236 through which power can be supplied to the tablet. In certain embodiments, an audio port 238 can also be interfaced with tablet interface block 236. Base station 102 can also include a power input 240 and a power converter 242 configured to convert the, e.g., 24V input from power input 240 into various voltage signals for use by the modules and blocks that comprise base station 102.

The hardware components can be used by multiple applications, or multiple tablets. For example, the WTA application, described in detail below, can require hardware device management functionality to handle resource allocation arrangement. The WTA can compensate for the capability of the associated tablet, e.g., an iPad without the use of Jailbreak to control multiple peripherals in the base station 102 without requiring the user to disconnect and connect to the various components. Initial setup of base station 102 can be performed through connecting the base station 102 to the network via an Ethernet port 224. Once configured the base station 102 can operate wirelessly or via Ethernet connection.

It will be understood that the diagram of FIG. 6 is a high level diagram and that other or fewer components can be included. Thus the illustration of FIG. 6 should not be seen as limiting in any way. It will also be understood that any of the components illustrated can be implemented using multiple devices and our distributed resources.

Figure 7:
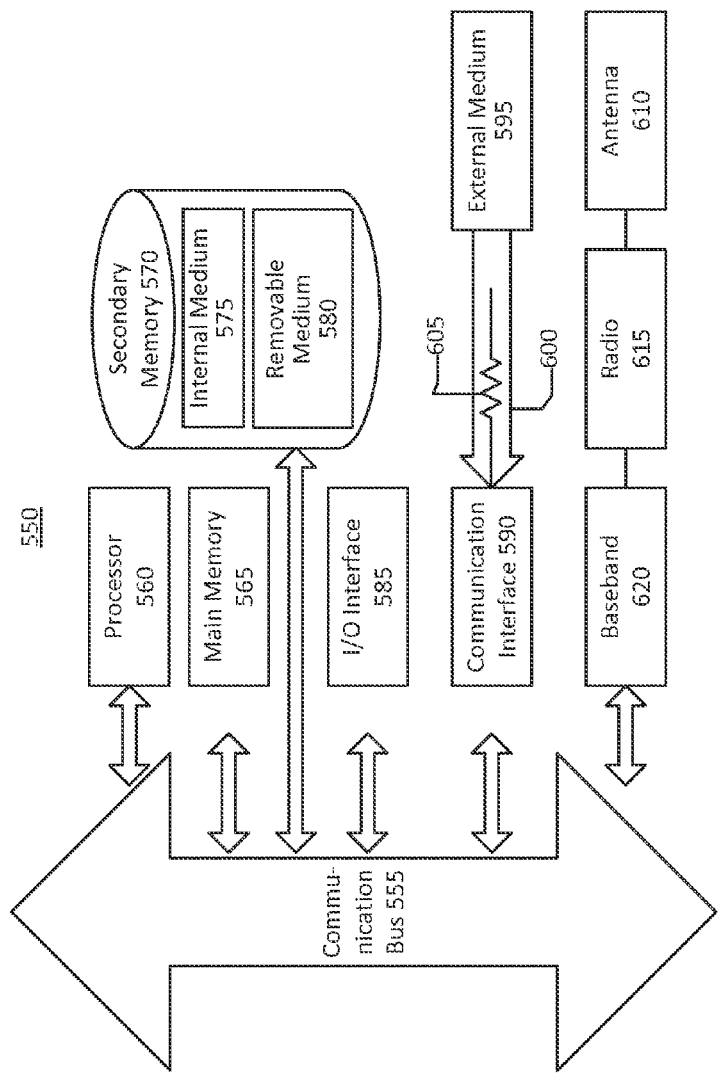
FIG. 7 illustrates a block diagram illustrating an example wired or wireless system that may be used as or in conjunction embodiments of the present application.

More generically, FIG. 7 is a block diagram illustrating an example wired or wireless system 550 that may be used in connection with various embodiments described herein. For example the system 550 may be used as or in conjunction with one or more of the mechanisms or processes described above, and may represent components of processors 202, user system(s), and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Pearl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Communication Process Overview

Figure 8:
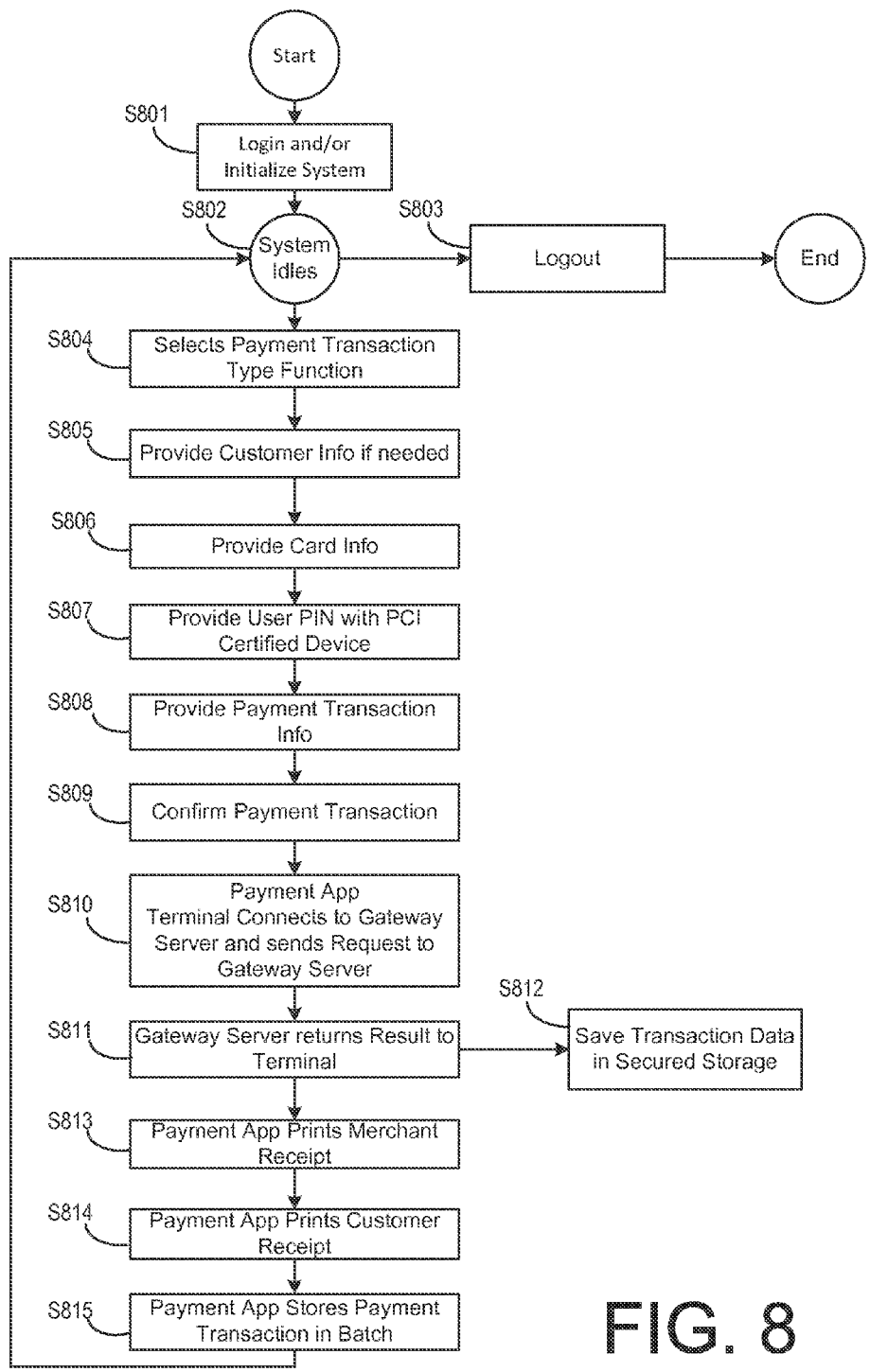
FIG. 8 illustrates a flow chart of a payment process using the base station and mobile device.
Figure 9:
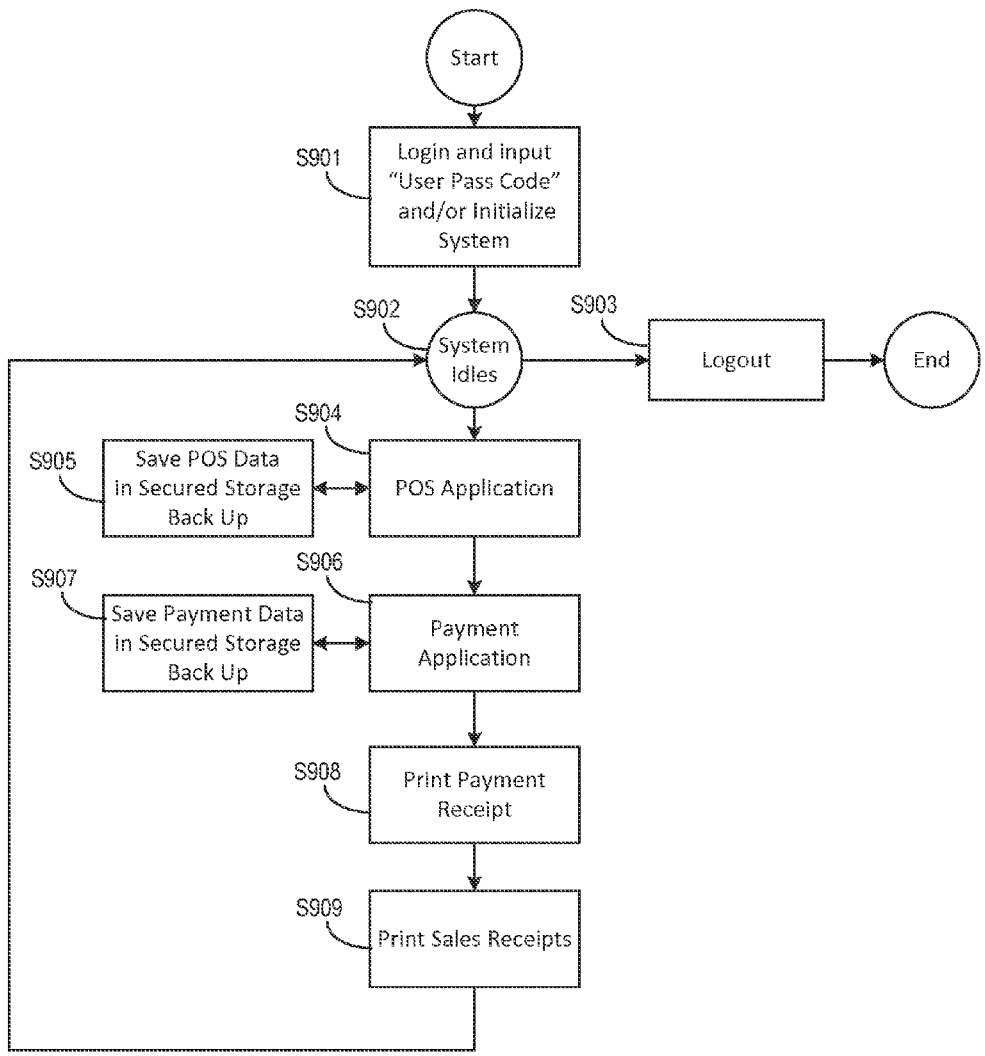
FIG. 9 illustrates a flow chart of an inventory process using the base station and the mobile device.

Software running on the mobile device may allow the mobile device to interact with the base station and perform both payment POS activities as well perform activities related to monitoring and maintaining inventory. FIG. 8 illustrates a process for performing a payment operation using the mobile device and base station according to an embodiment of the present application. FIG. 9 illustrates a process for performing a POS operation using the mobile device and base station according to an embodiment of the present application.

In the payment operation (i.e. a payment transaction) shown in FIG. 8, the system must first be initialized and the user (i.e. a sales representative, for example) must login as shown by S801. In some embodiments, this involves authenticating by the base station of the mobile device and authenticating by the mobile device the base station in order to ensure that a secure transaction in a commercial environment. Thus, an embedded system within the base station may communicate with a mobile device using a Wi-Fi Transportation Authority (WTA). The WTA is made up of a pair of applications, one residing on the mobile device, and one residing on the base station. In some embodiments, the WTA application residing on the mobile device may be replaced with a thin-client application running on a host server and accessed through a browser. Thus, in the case of a thin client application, the WTA is made up of a pair of applications, one residing on the host server which is accessed through the browser on the mobile device, and one application residing on the base station.

Together the pair of applications facilitates communication between the mobile device and the system embedded within the base station. Through the WTA, the mobile device and the base station authenticate each other prior to any sales transactions being processed to ensure that only authorized mobile devices working in conjunction with authorized base stations can execute sales transactions. Without the proper authenticated WTA application installed, a mobile device cannot communicate with the base station. Additionally, a unique identifier (VID/PID) may be stored by the system embedded in the base station and to complete authentication a user may be required to enter the identifier through the mobile device.

Additionally, a separate POS application may be used to perform the POS operations. In other words, a separate POS application running in parallel with the WTA application is used to perform the POS transactions. The POS application uses the WTA application to communicate with the base station and thus must be authenticated by the WTA application to communicate with the base station. Further, the data may be transmitted between the WTAs may be further encrypted using Wi-Fi WEP/WPA encryption.

Additionally, a Terminal Management System (TMS) download tool may be used to download authentication information so that a payment application can be downloaded to the base station to perform the base station side of POS transactions. The TMS also locks the payment application to prevent unauthorized downloading of applications into the base station.

Additionally, in some embodiments a pin pad may be used in combination with base station and mobile device to allow a customer to key in personal identification information for payment transactions. In such embodiments, the pin pad is authenticated by the base station during the authentication of S801 to ensure that only the approved pin pad can be used with the base station.

Once the system has self-authenticated and a user (i.e. sales representative) has logged in, the system enters an idle state in S802. During the idle state, the system waits for the user to initiate a payment transaction. During S802, the system monitors how long the system has been in an idle state. If the system determines it has been in an idle state for an amount of time that exceeds a threshold (i.e. 5 minutes, 10 minutes, etc.), the system may automatically logout in S803 so that login and authentication of S801 must be repeated to prevent access by an unauthorized person.

In S804, the authorized user (i.e. sales representative) selects a payment transaction function using the POS application to begin a payment transaction. This may be done through any method of interface apparent to a person of ordinary skill in the art. For example, an authorized user may touch a control button on a displayed user interface.

In some embodiments, the user may be provided with an interface for entry of customer information (i.e. customer name, mailing address, email address, telephone, zip code, etc.) in S805 once the payment transaction has been selected. The user may enter the customer information using the displayed interface. In some embodiments, the user may elect to bypass the customer information and proceed to payment information entry in S806.

In S806, the authenticated user enters payment information using the mobile device. In some embodiments, the user may enter payment information by swiping a credit card through a card reader in communication with the mobile device or the base station. Connection between the mobile device or base station and the credit card reader can be achieved through either wired or wireless communication.

After the credit card information has been entered, a customer can be requested to provide a pin number associated with card information in S807 using the authenticated pin pad device discussed above.

Once the pin number has been provided, payment transaction information indicating the purchase value amount and the payment information is provided to the authorized user (i.e. the sales representative) in S808 so that any errors can be detected prior to transmission to the financial institution associated with the credit card. After the payment transaction information is provided to the authorized user, the user confirms the accuracy of the information in S809.

Once the payment transaction has been confirmed, the payment module on the base station connects to a gateway server through the base station and sends a request for payment confirmation of the transaction in S810. Once the request for payment confirmation is sent in S810, the payment module on the base station goes into an idle state awaiting a reply from the Gateway server in S811.

Once a reply or result is received from the gateway server in S811, the transaction data, including the payment information and the confirmation result returned by the gateway server, is stored in the secured storage device of the embedded system of the base station in S812. Additionally, once the result is returned by the gateway server, a merchant receipt may be printed using a printer in communication with the base station (communication may be wired or wireless) in S813. Additionally, a customer receipt may also be printed using the printer in S814.

Finally, the payment module on the base station may store the payment transaction information in batches with other payment transactions in S815. Once the payment transaction is successfully stored in batch, the system returns to the idle state of S802 awaiting another transaction to be initiated. Again, if the system is idle for a period of time exceeding a threshold, the system may automatically logout to prevent unauthorized access.

FIG. 9 illustrates a process for performing an POS operation using the mobile device and base station according to an embodiment of the present application.

In the POS operation (i.e. a payment transaction) shown in FIG. 9, the system must first be initialized and the user (i.e. a sales representative, for example) must login as shown by S901. In some embodiments, this involves authenticating by the base station of the mobile device and authenticating by the mobile device the base station in order to ensure that a secure transaction in a commercial environment. Thus, an embedded system within the base station can communicate with mobile device using a Wi-Fi Transportation Authority (WTA). The WTA is made up of a pair of applications, one residing on the mobile device, and one residing on the base station or host for the thin-client application accessed through the browser.

Together the pair of applications facilitates communication between the mobile device and the system embedded within the base station. Through the WTA, the mobile device and the base station authenticate each other prior to any transactions being processed to ensure that only authorized mobile devices working in conjunction with authorized base stations can execute sales transactions. Without the proper authenticated WTA application installed or securely accessed to the host through a browser, a mobile device cannot communicate with the base station. Additionally, a unique identifier (VID/PID) may be stored by the system embedded in the base station and to complete authentication a user may be required to enter the identifier through the mobile device.

Additionally, a separate POS application may be used to perform the POS operations. In other words, a separate POS application running in parallel with the WTA application is used to perform the POS transactions. The POS application uses the WTA application to communicate with the base station and thus must be authenticated by the WTA application to communicate with the base station.

Additionally, a Terminal Management System (TMS) download tool may be used to download authentication information to the base station so that a payment application can be downloaded to perform the base station side of POS transactions. The TMS also locks the payment application to prevent unauthorized downloading of applications into the base station.

Additionally, in some embodiments a pin pad may be used in combination with base station and mobile device to allow a customer to key in personal identification information for payment transactions. In such embodiments, the pin pad is authenticated by both the mobile device and the base station during the authentication of S901 to ensure that only the approved pin pad can be used with the base station.

Once the system has self-authenticated and a user (i.e. sales representative) has logged in, the system enters an idle state in S902. During the idle state, the system waits for the user to initiate a POS transaction (i.e. access the inventory application). During S902, the system monitors how long the system has been in an idle state. If the system determines it has been in an idle state for an amount of time that exceeds a threshold (i.e. 5 minutes, 10 minutes, etc.), the system may automatically logout in S903 so that login and authentication of S901 must be repeated to prevent access by an unauthorized person.

Once the authorized user (i.e. sales representative) initiates an inventory transaction, the POS application is activated to access the inventory information through the POS application in S904. Thus, the inventory may be updated to reflect any items being purchased and the pricing information for purchased items may be retrieved from secured storage located within the base station. Once the inventory is updated and the pricing is retrieved, the POS data is re-saved to the secured storage located within the base station in S905.

Once the POS data is accessed, retrieved, and updated to the secured storage, the retrieved pricing information is transmitted to the payment application in S906 and a payment process is performed according to the process discussed above with respect to FIG. 8. Once the payment transaction is completed, the payment data is saved to the secured storage of the base station in S907.

Once the payment process has been completed in S906 and the payment data is saved to the secured storage of the base station in S907, a payment receipt may be printed for a customer records using a printer in communication with the base station (i.e. a printer connected through wired or wireless connection with the base station). Further, a sales receipt for store records may also be printed using the printer in S909. Once the sales receipt is printed in S909, the system may return to an idle state in S902 and await subsequent transactions. Again, if the system is in an idle state for a period of time exceeding a threshold, the system may automatically log out in S903 to prevent unauthorized access.

Thus, as indicated, the transaction information is stored in base station 102. Moreover, the base station and whatever peripheral but in particular the mobile device must co-authenticate each other before the device or peripheral will be granted access to the transaction information. The TMS ensures that only valid and authorized processing applications are loaded onto the base station. All of this ensures that the data can be safely maintained on the base station, which in turn allows the base station to communicate with several devices and store the aggregate transaction information. Moreover, if a device is stolen, it will not include the transaction information.

Software Architecture

Figure 10:
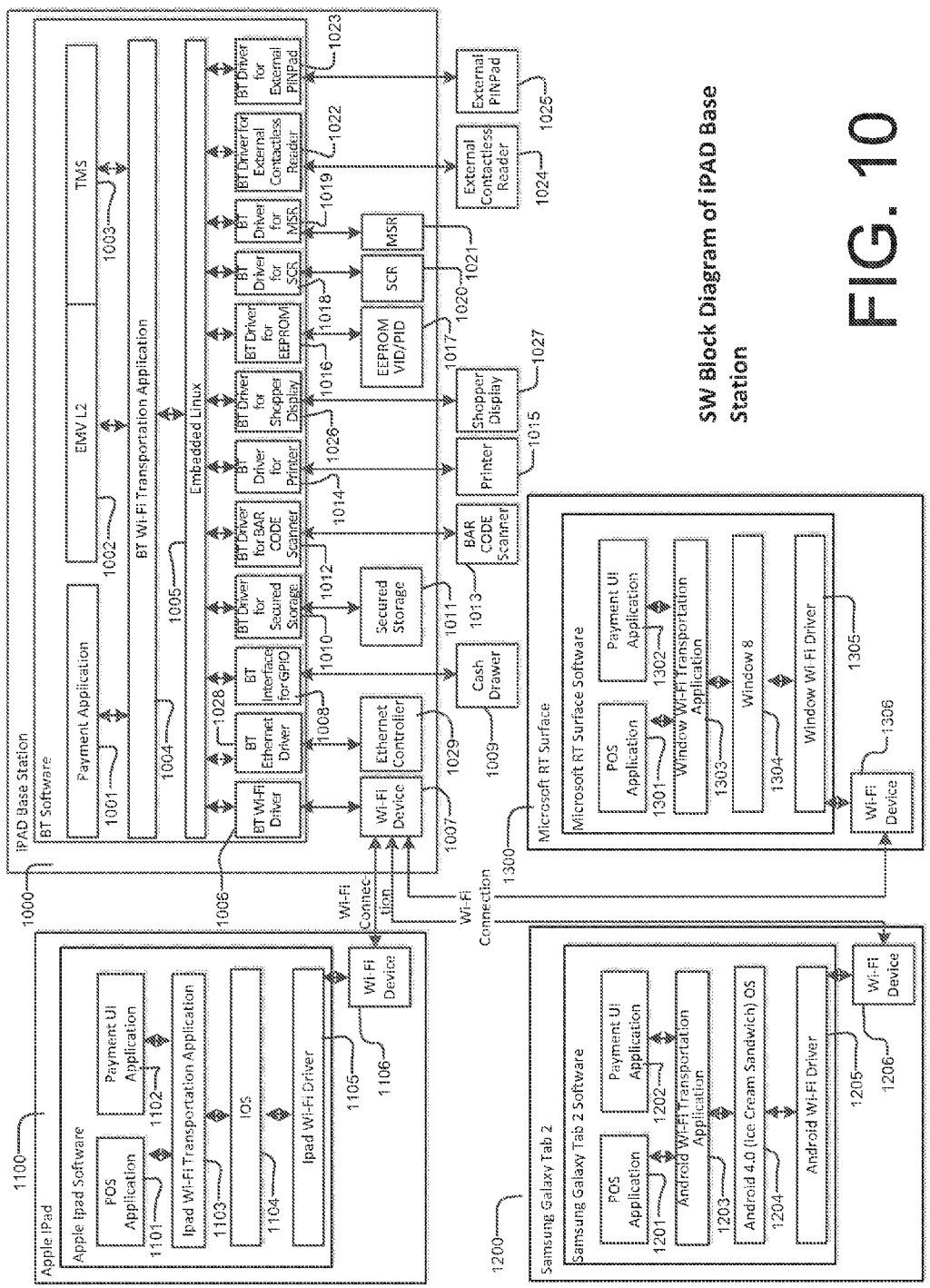
FIG. 10 provides a block diagram showing a first embodiment of the software level architecture, and interaction between, an embodiment of the base station and one or more mobile devices.

FIG. 10 provides a block diagram showing the software level architecture, and interaction between, an embodiment of the base station 1000 and one or more mobile devices 1100, 1200, 1300. Though different mobile devices (i.e. an Apple IPAD 1100, a Samsung Galaxy Tab 2 1200, a Microsoft RT Surface 1300) may be used, a number of features can still be common to the mobile device used regardless of what type of mobile device is selected. Specifically, in mobile device 1100, 1200, 1300 includes a POS application 1101, 1201, 1301 that is used to perform the POS transactions, a Payment User interface application 1102, 1202, 1301 and a WTA application 1103, 1203, 1303, which is configured to interface with the individual operating systems 1104, 1204, 1304 of the different mobile devices 1100, 1200, 1300. Additionally, each of the different mobile devices 1100, 1200, 1300 may also have a Wi-Fi driver 1105, 1205, 1305 configured to allow each of the individual operating systems 1104, 1204, 1304 to control a Wi-Fi device 1106, 1206, 1306 integrated into the mobile devices 1100, 1200, 1300 to allow wireless communication with the base station 1000.

As discussed above, the base station 1000 includes an embedded system (Best terminal (BT)) that is independent from the mobile device 1000, 1200, 1300. The embedded system includes its own software that can include a payment application 1001, EMV L2 application 1002, and a terminal management system 1003 that each interface with a WTA application 1004. The WTA Application 1004 allows the payment application 1001, EMV L2 application 1002, and terminal management system (TMS) 1003 to interface with the embedded operating system 1005 of the embedded system (BT OS). In some embodiments, the embedded operating system 1005 may be a Linux based system, but is not particularly limited to a Linux based operating system. The embedded operating system 1005 communicates with a plurality of drivers to allow the embedded system to control a plurality of peripheral devices. Specifically, the embedded system may include a Wi-Fi driver 1006 to allow the operating system 1005 to communicate with a Wi-Fi device 1007, through which the base station 1000 can communicate with the mobile devices 1100, 1200, 1300.

The authentication between the base station 1000 and one of the mobile devices 1100, 1200, 1300 is done through the base station WTA application 1004 and the WTA application of the respective mobile devices (or host accessed by the respective mobile devices) 1103, 1203, 1303. In other words, one WTA application resides on each of the mobile devices (host securely accessed by each mobile device through a browser) 1100, 1200, 1300, and one WTA application resides on the base station 1000. Further, each of the WTA applications 1103, 1203, 1303 of the mobile devices 1100, 1200, 1300 authenticate the WTA application 1004 of the base station 1000 and the WTA application 1004 of the base station 1000 authenticates the WTA applications 1103, 1203, 1303 of the respective mobile devices 1100, 1200, 1300.

Further, there is also additional authentication between the POS applications 1101, 1201, 1301 of the mobile devices 1100, 1200, 1300 and the WTA application 1004 of the base station 1000. The POS applications 1101, 1201, 1301 may be readily available third party POS applications available through various mobile device application stores (i.e. iTunes App store, Android Play store, etc.). However, only POS applications 1101, 1201, 1301 of the mobile devices that have been authenticated by the WTA application of the base station 1000 can use the WTA applications 1103, 1203, 1303 to communicate with the base station 1000. Thus, even if a user downloads the correct POS application into a mobile device, the POS application cannot use the base station 1000 until it is authenticated because the WTA applications 1004, 1103, 1203, 1303 control the data flow between the mobile devices 1100, 1200, 1300 and the base station 1000.

Additionally, the Terminal Management System (TMS) 1003 includes a download tool that is used for download authentication for the base station 1000 when downloading and installing the payment application 1001 on the base station 1000. Thus, though the POS applications 1101, 1201, 1301 of the mobile devices 1100, 1200, 1300 may be directly downloadable through online app stores, the TMS 1003 locks down the payment application 1001 to prevent unauthorized downloading of applications into the base station 1000.

Further, the embedded system of the base station 1000 may also include a driver 1008 to allow the base station 1000 to communicate with a cash drawer 1009 to facilitate making change for cash purchases. A secured storage driver 1010 may be used to communicate with the secured storage device 1011 embedded within the base station 1000. A bar code scanner driver 1012 may also be provided to allow the base station to interface with a bar code scanner or reader 1013. Further, a print driver 1014 may also be provided to allow the base station to communicate with a printer 1015, either wirelessly or through a wired connection.

Further, a non-volatile memory driver 1016 may be provided to allow the base station to control a non-volatile memory such as an Electrically Erasable Programmable Memory (EEPROM) 1017. A unique identifier (VID/PID) and other information can be stored in the non-volatile memory 1017 inside base station 1000. The portable devices 1100, 1200, 1300 can use this data for authentication between the portable devices 1100, 1200, 1300 and the base station 1000. Additionally, one or more card reader drivers 1018, 1019 may be provided to control one or more card reader modules 1020, 1021. Further, a contactless reader driver 1022 and an external PIN pad driver 1023 may be provided to control an external contactless reader 1024 and an external PIN pad 1025. The mobile devices 1100, 1200, 1300 and base station 1000 will authenticate the pin pad so that only an approved PIN pad can be used with the base station 1000 and mobile devices 1100, 1200, 1300. Additionally, in some embodiments, the embedded system of the base station 1000 may also include a customer or shopper display driver 1026 to interface with a display 1027 for a shopper or customer to view the transaction as it is being processed. Additionally, in some embodiments the base station 1000 may include an Ethernet driver 1028 to interface with an Ethernet controller.

Figure 11A:
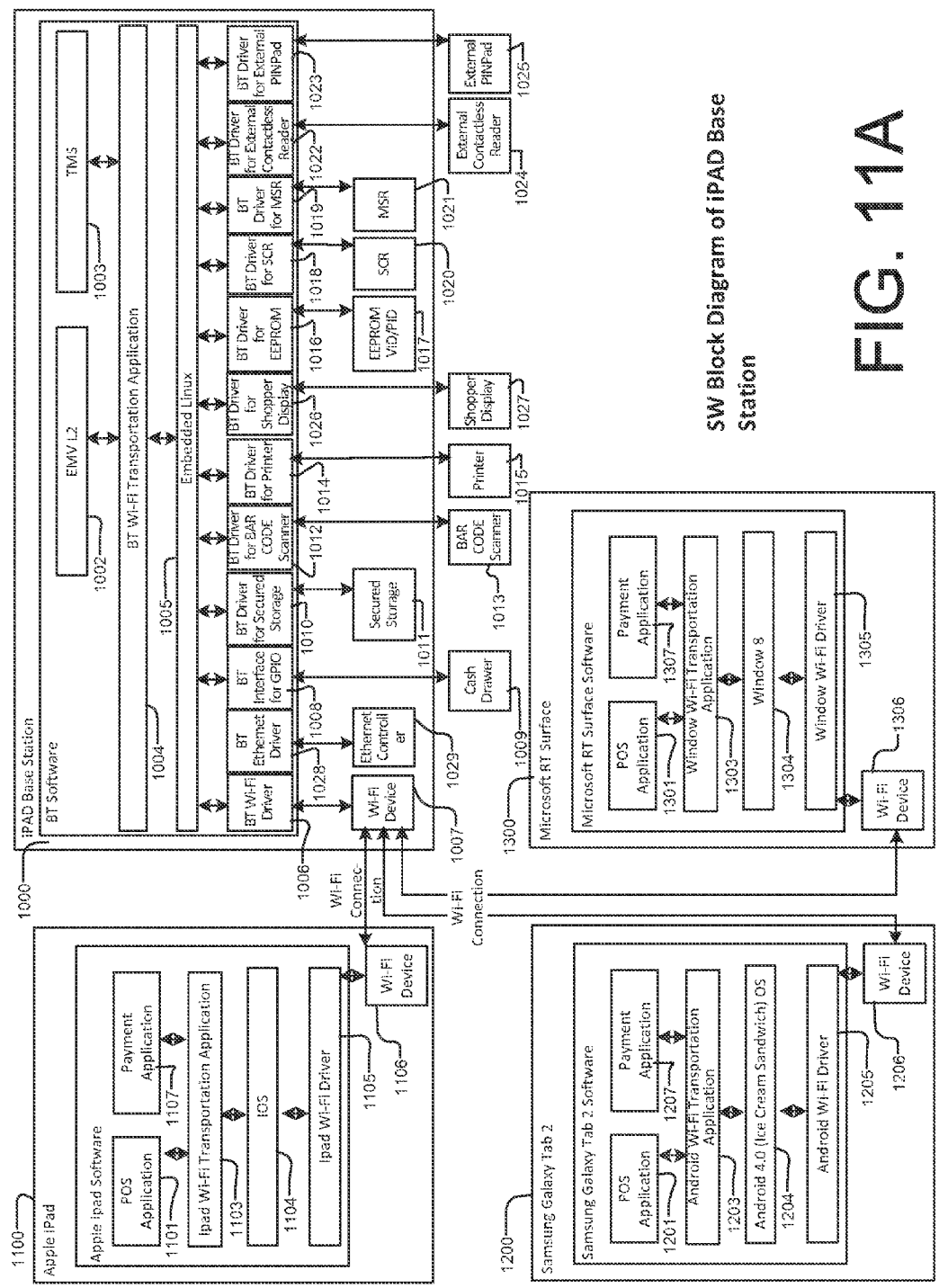
FIG. 11A provides a block diagram showing a second embodiment of the software level architecture, and interaction between an embodiment of the base station and one or more mobile devices.

FIG. 11A provides a block diagram showing a second embodiment of the software level architecture, and interaction between, an embodiment of the base station and one or more mobile devices. The second embodiment of the software level architecture shown in FIG. 11A is substantially similar to the embodiment shown in FIG. 10. Thus, similar components are labeled with the same reference numerals and redundant description is omitted.

In the embodiment shown in FIG. 10, a payment application 1001 was provided in the base station 1000 and a payment User Interface Application 1102, 1202, 1302 was provided on each of the mobile devices 1100, 1200, 1300. However, embodiments of the present application need not include a payment application 1001 provided in the base station 1000. Instead, as shown in the embodiment of FIG. 11A, a payment application 1107, 1207, 1307 may be separately provided on each of the mobile devices 1100, 1200, 1300. By running a payment application 1107, 1207, 1307 on the mobile devices 1100, 1200, 1300, the payment user interface application 1102, 1202, 1302 may be omitted from the mobile devices 1100, 1200, 1300 and the payment application 1001 may be omitted from the base station 1000.

Figure 11B:
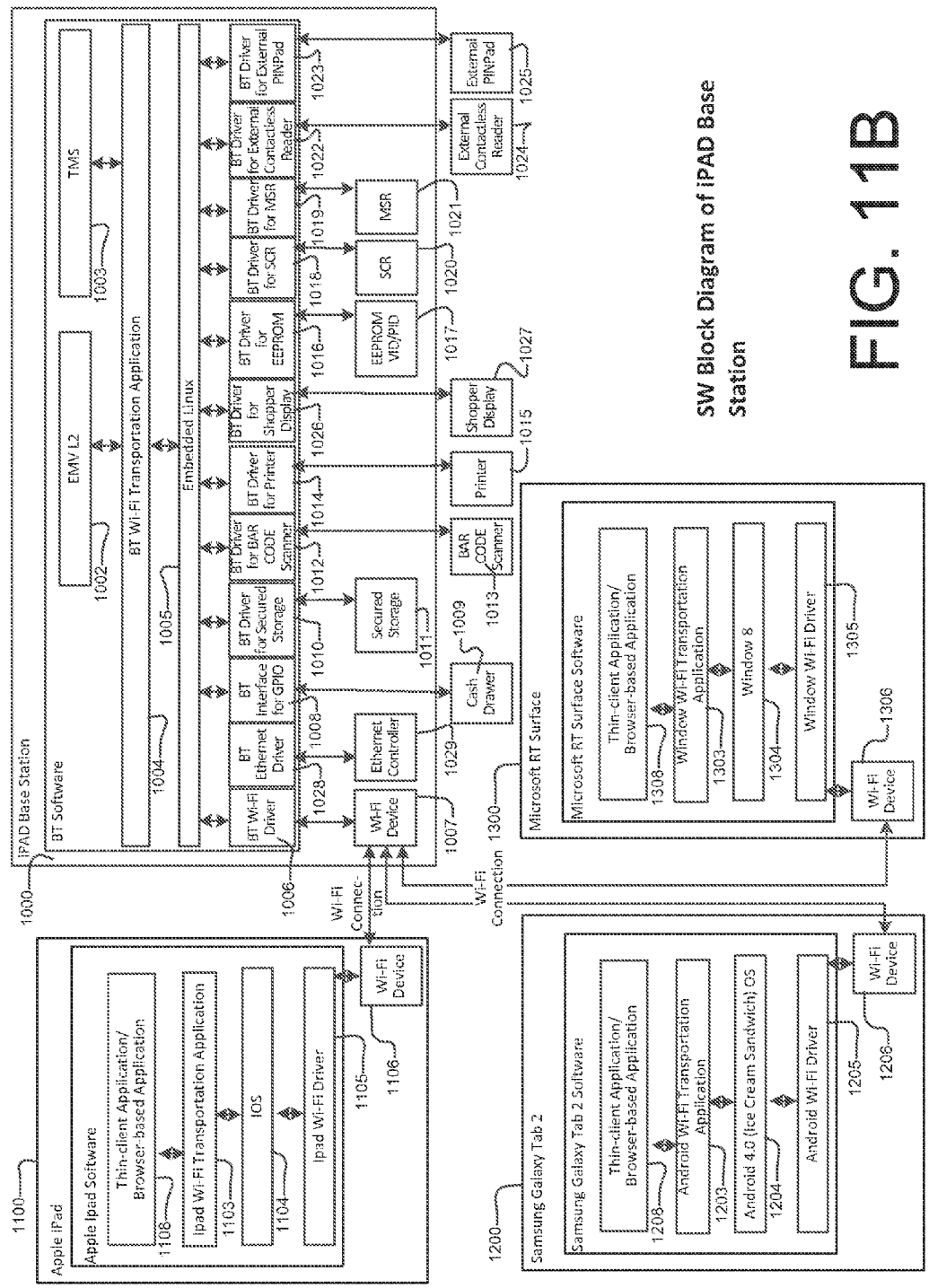
FIG. 11B provides a block diagram showing a third embodiment of the software level architecture, and interaction between, an embodiment of the base station and one or more mobile devices.
Figure 12A:
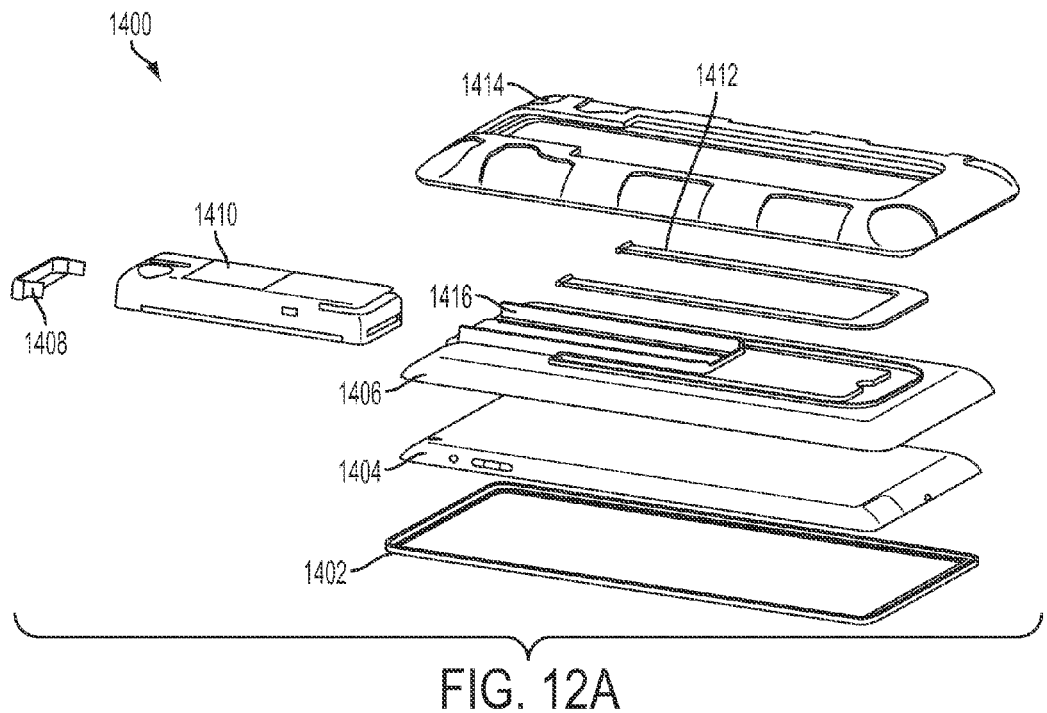
FIGS. 12A-12D provide perspective views of a case for the tablet having a card reader incorporated directly into the case.
Figure 12B:
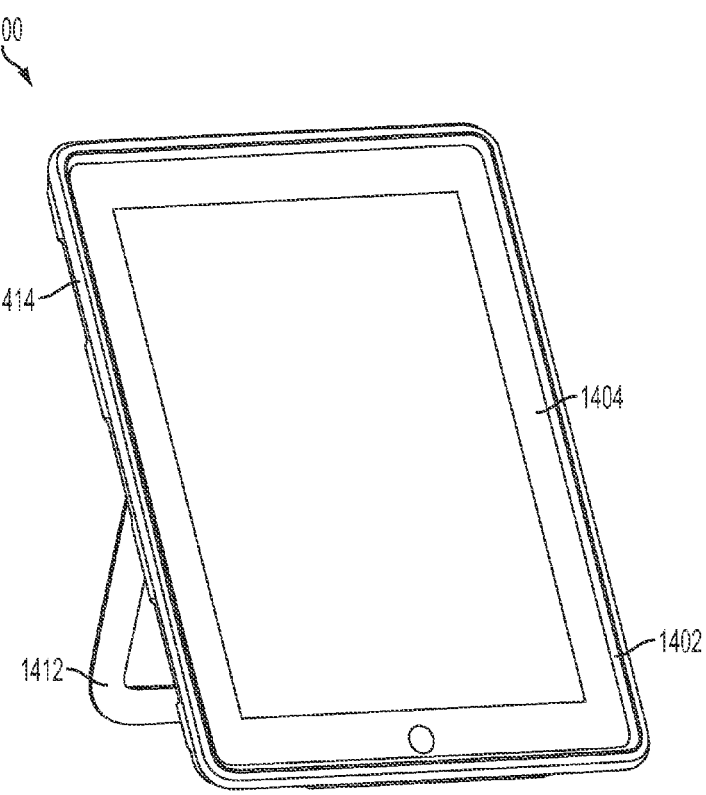
Figure 12C:
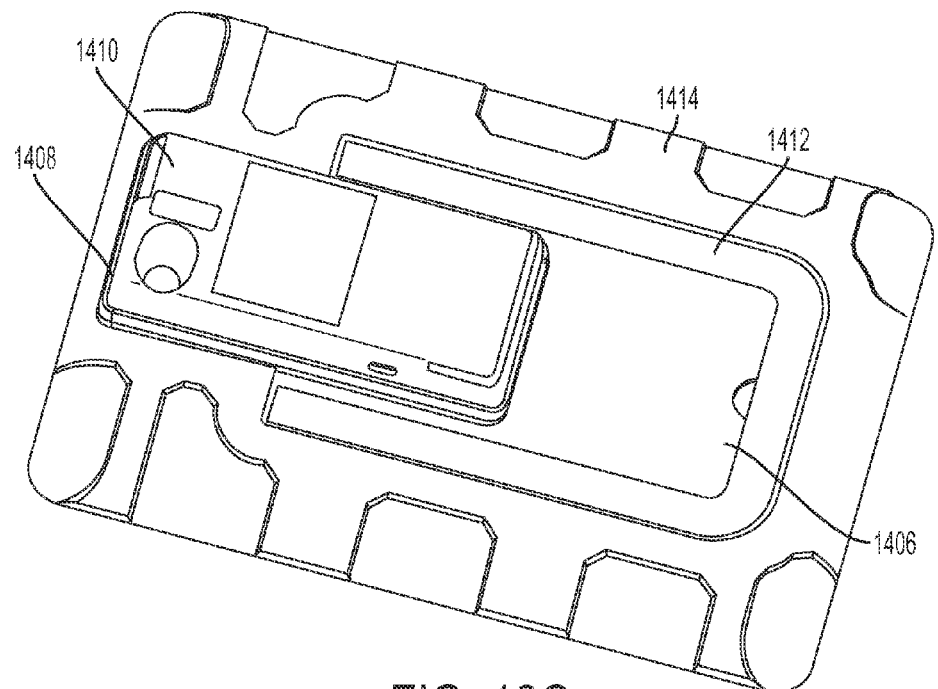
Figure 12D:
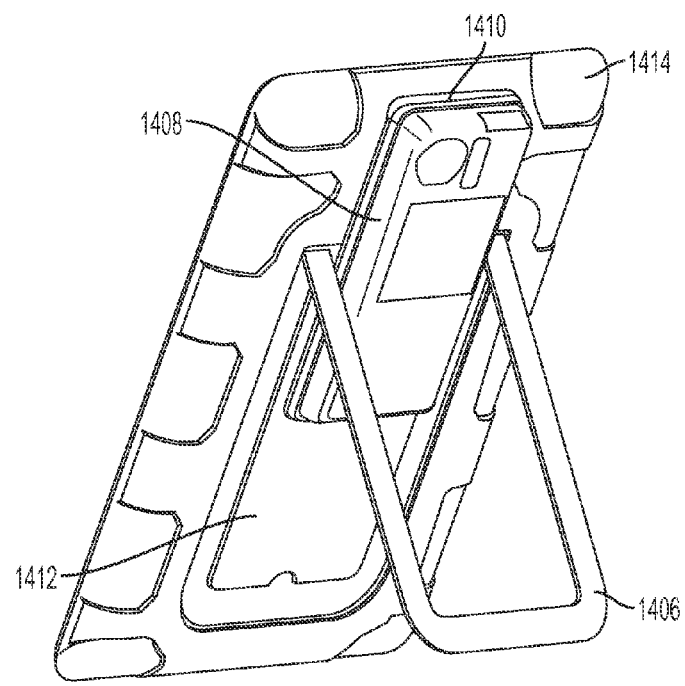

Further, FIG. 11B provides a block diagram showing a third embodiment of the software level architecture, and interaction between, an embodiment of the base station and one or more mobile devices. The third embodiment of the software level architecture shown in FIG. 11B is substantially similar to the embodiment shown in FIG. 10. Thus, similar components are labeled with the same reference numerals and redundant description is omitted.

In the embodiment shown in FIG. 10, a payment application 1001 was provided in the base station 1000 and a payment User Interface Application 1102, 1202, 1302 was provided on each of the mobile devices 1100, 1200, 1300. However, embodiments of the present application need not include a payment application 1001 provided in the base station 1000. Instead, as shown in the embodiment of FIG. 11B, a thin-client application or browser based application 1108, 1208, 1308 may be separately provided on each of the mobile devices 1100, 1200, 1300. By running a thin-client application or browser based application 1108, 1208, 1308 on the mobile devices 1100, 1200, 1300, the payment user interface application 1102, 1202, 1302 may be omitted from the mobile devices 1100, 1200, 1300 and the payment application 1001 may be omitted from the base station 1000.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for processing transactions, comprising:
 a. at least one mobile device comprising:
  i. a housing having a processor, and a Wi-Fi communication module disposed therein; and
 b. a base station comprising;
  i. a base station housing, wherein the base station housing houses an embedded system comprising:
   1. a processor; and
   2. a Wi-Fi communication module configured to communicate with the Wi-Fi communication module of the at least one mobile device;
  ii. a support stand configured to support the at least one mobile device, wherein the support stand comprises at least one arm having an adjustable position and configured to move to adjust the size of the support stand based on a size of at least one mobile device; and
 c. at least one peripheral device connected to base station, wherein the base station further comprises
 a. a payment module configured to perform payment transactions; and
 b. a first Wi-Fi transportation application, which causes the processor of the base station to control the payment module and the Wi-Fi communication module of the base station; and
 c. wherein the at least one mobile device further comprises:
  i. a payment user interface configured to allow a user to perform payment transactions with the payment module;
  ii. a Point of Sale (POS) module configured to perform Point of Sale operations;
  iii. a second Wi-Fi transportation application, which causes the processor of the at least one mobile device to control the POS module and the Wi-Fi communication module of the at least one mobile device; and
 d. wherein the first Wi-Fi transportation application is configured to cause the processor of the base station to prevent the payment module and the Wi-Fi communication module of the base station from communicating with the POS module, the payment user interface and the Wi-Fi communication module of the at least one mobile device unless the second Wi-Fi transportation application has been authenticated by the first Wi-Fi transportation application; and
 e. wherein the second Wi-Fi transportation application is configured to cause the processor of the at least one mobile device to prevent the POS module, the payment user interface and the Wi-Fi communication module of the at least one mobile device from communicating with the payment module and Wi-Fi communication module of the base station unless the first Wi-Fi transportation application has been authenticated by the second Wi-Fi transportation application.

2. The system of claim 1, wherein a plurality of payment modules may be installed in the base station;
 a. wherein the base station further comprises a terminal management system (TMS) download tool configured to control the processor of the base station to authenticate which of the plurality of payment modules is an authorized payment module; and b. wherein the TMS download tool controls the processor to prevent unauthorized payment applications from communicating with the at least one mobile device.

3. The system of claim 1, wherein the base station further comprises a secure storage device, and wherein the first Wi-Fi transportation application is further configured to cause the processor of the base station to prevent the at least one mobile device from accessing the secured storage device unless the second Wi-Fi transportation application of the at least one mobile device has been authenticated by the first Wi-Fi transportation application.

4. The system of claim 3, wherein the POS module is configured to store data relating to performed Point of Sale operations to the secured storage device when the second Wi-Fi transportation application has been authenticated by the first Wi-Fi transportation application.

5. The system of claim 1, wherein the at least one peripheral device comprises at least one of a pin pad, a keyboard, a user interface, a printer, and a display device.

6. A system for processing transactions, comprising:
a. at least one mobile device comprising:
 i. a housing having a processor, and a Wi-Fi communication module disposed therein; and
b. a base station comprising:
 i. a base station housing, wherein the base station housing houses an embedded system comprising:
  1. a processor, and
  2. a Wi-Fi communication module configured to communicate with the Wi-Fi communication module of the at least one mobile device:
 ii. a support stand configured to support the at least one mobile device, wherein the support stand comprises at least one arm having an adjustable position and configured to move to adjust the size of the support stand based on a size of the at least one mobile device; and
c. at least one peripheral device connected to the base station,
wherein the at least one peripheral device is configured to communicate with the base station and the at least one mobile device via a wireless connection; and
a. wherein the at least one peripheral device further comprises a third Wi-Fi transportation application configured to control the at least one peripheral device to prevent the at least one peripheral device from communicating with either the base station or the at least one mobile device unless first and second Wi-Fi transportation applications have been authenticated by the third Wi-Fi transportation application.
b. wherein the base station further comprises a first Wi-Fi transportation application configured to control the processor of the base station to prevent the at least one peripheral device from communicating with the base station unless the third Wi-Fi transportation application has been authenticated by the first Wi-Fi transportation application; and
c. wherein the at least one mobile device comprises a second Wi-Fi transportation application configured to control the processor of the at least one mobile device to prevent the at least one peripheral device from communicating with the at least one mobile device unless the third Wi-Fi transportation application has been authenticated by the second Wi-Fi transportation application.

7. The system of claim 6, wherein the at least one peripheral device comprises at least one of a pin pad, a keyboard, a user interface, a printer, and a display device.

* * * * *